United States Patent
Bremser et al.

(10) Patent No.: US 6,916,878 B2
(45) Date of Patent: Jul. 12, 2005

(54) AQUEOUS DISPERSIONS THAT ARE FREE OR SUBSTANTIALLY FREE FROM VOLATILE ORGANIC COMPOUNDS, AND METHOD FOR THEIR PRODUCTION AND USE THEREOF

(75) Inventors: Wolfgang Bremser, Münster (DE); Hans-Peter Steiner, Sendenhorst (DE); Frank Strickmann, Steinfurt (DE)

(73) Assignee: BASF Coatings AG, Munster (DE)

( * ) Notice: Subject to any disclaimer, the term of this patent is extended or adjusted under 35 U.S.C. 154(b) by 113 days.

(21) Appl. No.: 10/468,446

(22) PCT Filed: Mar. 8, 2002

(86) PCT No.: PCT/EP02/02546
§ 371 (c)(1),
(2), (4) Date: Aug. 20, 2003

(87) PCT Pub. No.: WO02/079308
PCT Pub. Date: Oct. 10, 2002

(65) Prior Publication Data
US 2004/0059053 A1 Mar. 25, 2004

(30) Foreign Application Priority Data
Mar. 29, 2001 (DE) .......................... 101 15 529

(51) Int. Cl.$^7$ .......................... C08L 53/00; C08K 13/08
(52) U.S. Cl. ..................... 524/847; 493/494; 493/497
(58) Field of Search ................................. 524/493, 494, 524/497, 847, 577

(56) References Cited

U.S. PATENT DOCUMENTS

| | | | |
|---|---|---|---|
| 5,691,425 A | 11/1997 | Klein et al. | 525/455 |
| 5,698,624 A * | 12/1997 | Beall et al. | 524/445 |
| 6,001,424 A | 12/1999 | Lettmann et al. | 427/407.1 |
| 6,063,861 A | 5/2000 | Irle et al. | 524/591 |
| 6,162,506 A | 12/2000 | Lettmann et al. | 427/407.1 |
| 6,218,000 B1 * | 4/2001 | Rudolf et al. | 428/317.9 |
| 6,372,875 B1 | 4/2002 | Mayer et al. | 528/60 |
| 6,602,972 B1 | 8/2003 | Schwarte et al. | 528/45 |
| 6,607,788 B1 | 8/2003 | Wegner et al. | 427/388.4 |
| 6,727,316 B1 * | 4/2004 | Bremser | 524/510 |
| 2003/0124357 A1 | 7/2003 | Kagerer et al. | 428/422.8 |

FOREIGN PATENT DOCUMENTS

| | | | | |
|---|---|---|---|---|
| CA | 2016 097 | 9/1992 | ............ | C09D/5/02 |
| CA | 2181 934 | 7/1996 | ......... | C08F/283/00 |
| CA | 2377 757 | 6/2000 | ......... | C09D/133/06 |
| CA | 2377759 | 6/2000 | ......... | C09D/157/04 |
| CA | 2377927 | 6/2000 | ............ | H10M/8/04 |
| CA | 2383 937 | 10/2000 | ......... | C08F/283/00 |
| CA | 2389332 | 10/2000 | ......... | C08F/290/06 |
| CA | 2073 115 | 8/2002 | ......... | C09D/175/14 |
| CA | 2113 964 | 9/2002 | ......... | C08F/283/00 |
| DE | 197 36 535 | 1/1999 | ......... | C09D/151/08 |
| DE | 199 30 067 | 1/2001 | ......... | C09D/133/04 |
| EP | 0 919 579 | 11/1998 | ......... | C08F/283/00 |
| WO | WO 9716479 A1 * | 5/1997 | ............ | C08K/3/00 |
| WO | WO02/079288 | 10/2002 | ......... | C08F/283/00 |

OTHER PUBLICATIONS

Machine Translation of JP10–158345, Publication Date Jun. 16, 1998 from JPO.

* cited by examiner

*Primary Examiner*—Kelechi C. Egwim

(57) ABSTRACT

Aqueous dispersions entirely or substantially free from volatile organic compounds, comprising
(A) at least one block copolymer preparable by two-stage or multistage free-radical copolymerization in an aqueous medium of
  a) at least one olefinically unsaturated monomer selected from the group consisting of hydrophilic and hydrophobic olefinically unsaturated monomers, and
  b) at least one olefinically unsaturated monomer different than the olefinically unsaturated monomer (a) and of the general formula I $$R^1R^2C\!=\!CR^3R^4 \qquad (I)$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;
and
(B) hydrophilic nanoparticles;
processes for preparing them, and their use as or to prepare coating materials, adhesives, and sealing compounds.

24 Claims, No Drawings

AQUEOUS DISPERSIONS THAT ARE FREE OR SUBSTANTIALLY FREE FROM VOLATILE ORGANIC COMPOUNDS, AND METHOD FOR THEIR PRODUCTION AND USE THEREOF

FIELD OF THE INVENTION

The present invention relates to novel aqueous dispersions entirely or substantially free from volatile organic compounds (VOCs). The present invention further relates to a novel process for preparing aqueous dispersions entirely or substantially free from VOCs. The present invention additionally relates to the use of the novel aqueous dispersions entirely or substantially free from VOCs as novel coating materials, adhesives, and sealing compounds, or for preparing the same. The present invention relates not least to the use of the novel coating materials, adhesives, and sealing compounds to coat, bond, and seal motor vehicle bodies and components thereof, buildings inside and outside, doors, windows, and furniture, and to coat, bond, and seal in the context of industrial coating, including coils, containers, electrical components, and white goods.

BACKGROUND OF THE INVENTION

The use of dispersions of addition copolymers preparable by single-stage or multistage free-radical copolymerization of
a) at least one olefinically unsaturated monomer and
b) at least one olefinically unsaturated monomer different than the olefinically unsaturated monomer (a) and of the general formula I $$R^1R^2C=CR^3R^4 \qquad (I)$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;
in an aqueous medium as binders in coating materials, especially aqueous basecoat materials (cf. the German patent application DE 199 30 665 A 1), primer-surfacers and antistonechip primers (cf. the German patent application DE 199 30 067 A 1), and clearcoat materials (cf. the German patent application DE 199 30 664 A 1) is known. These dispersions are entirely or substantially free of volatile organic compounds. They may comprise transparent fillers based on silica, alumina or zirconium oxide, as described in Römpp Lexikon "Lacke und Druckfarben", Georg Thieme Verlag, Stuttgart, 1998, pages 250 to 252, "fillers". The German patent applications do not describe how the transparent fillers are to be specifically incorporated.

The aqueous basecoat materials known from the German patent application DE 199 30 665 A 1 and the basecoats produced from them, and also the primer-surfacers and antistonechip primers known from the German patent application DE 199 30 067 A 1, and the coatings produced from them, exhibit outstanding performance properties. However, the application properties of the aqueous basecoat materials, primer-surfacers, and antistonechip primers are in need of further improvement.

The clearcoat materials known from the German patent application DE 199 30 664 A 1 and the clearcoats produced from them likewise possess outstanding performance properties. Nevertheless, the application properties of the clearcoat materials and the scratch resistance of the clearcoats are in need of further improvement.

Nanoparticles based on alumina, silica, and zirconium oxide are known per se. They are commonly sold in the form of dispersions in alcohols such as isopropanol, ketones such as methyl isobutyl ketone, or in monomers curable with actinic radiation. If dispersions in alcohols or ketones are used, however, highly volatile organic compounds are again introduced into the aqueous coating materials, adhesives and sealing compounds. On the other hand, the dispersions based on monomers cannot be incorporated into the aqueous coating materials, adhesives, and sealing compounds.

The German patent applications DE 101 06 567.1 and DE 101 06 566.3, unpublished at the priority date of the present specification, describe aqueous coating materials based on aqueous dispersions of copolymers prepared by free-radical copolymerization of monomers (a) and (b) in a miniemulsion. These dispersions are in fact entirely or substantially entirely free of volatile organic compounds. To prepare and stabilize the miniemulsions, however, it is necessary to use comparatively large amounts of nonvolatile, ultrahydrophobic, organic compounds, which ultimately influence the profile of properties of the coating materials and of the coatings produced from them. The dispersions may include, inter alia, nanoparticles, not specified in any detail. Moreover, there is no description of how the nanoparticles are to be incorporated into the dispersions.

SUMMARY OF THE INVENTION

It is an object of the present invention to disperse fairly large amounts of nanoparticles stably into aqueous dispersions without occasioning instances of turbidity, gel specks or agglomerates. It is a further object of the present invention to provide novel aqueous dispersions, entirely or substantially free of volatile organic compounds, which contain relatively large amounts of nanoparticles, exhibit no instances of turbidity, gel specks or agglomerates, and can be used as, or to prepare, readily applicable coating materials, adhesives, and sealing compounds. The novel coating materials, adhesives, and sealing compounds entirely or substantially free of VOCs are intended to provide coatings, adhesive films, and seals which are scratch-resistant, tough and elastic, and free from stress cracks or drying cracks, without releasing VOCs. Furthermore, the novel aqueous dispersions entirely or substantially free of VOCs are to be easy to prepare.

The invention accordingly provides the novel aqueous dispersions, entirely or substantially free from volatile organic compounds, comprising
(A) at least one block copolymer preparable by two-stage or multistage free-radical copolymerization in an aqueous medium of
  a) at least one olefinically unsaturated monomer selected from the group consisting of hydrophilic and hydrophobic olefinically unsaturated monomers, and
  b) at least one olefinically unsaturated monomer different than the olefinically unsaturated monomer (a) and of the general formula I $$R^1R^2C=CR^3R^4 \qquad (I)$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;

and (B) hydrophilic nanoparticles.

In the text below, the novel aqueous dispersions entirely or substantially free of VOCs are referred to as "dispersions of the invention" for short.

The invention also provides a novel process for preparing aqueous dispersions entirely or substantially free of volatile organic compounds, which involves mixing (1) at least one aqueous dispersion entirely or substantially free of volatile organic compounds and comprising (A) at least one block copolymer preparable by two-stage or multistage free-radical copolymerization in an aqueous medium of a) at least one olefinically unsaturated monomer selected from the group consisting of hydrophilic and hydrophobic olefinically unsaturated monomers, and b) at least one olefinically unsaturated monomer different than the olefinically unsaturated monomer (a) and of the general formula I

$$R^1R^2C=CR^3R^4 \qquad (I)$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;

(2) with at least one kind of hydrophilic nanoparticles.

In the text below, the novel process for preparing aqueous dispersions entirely or substantially free of VOCs is referred to as the "process of the invention" for short.

Further subject matter of the invention will emerge from the description.

In the light of the prior art it was surprising and unforeseeable for the skilled worker that the object on which the present invention was based might be achieved by means of the dispersions of the invention and the process of the invention. A particular surprise was that the nanoparticles could be incorporated into the aqueous dispersions simply, without the use of customary organic solvents or monomers, and in greater amounts than was hitherto possible without the incidence of turbidity, gel specks or agglomerates. Even more surprising was the broad usefulness of the dispersions of the invention as or to prepare coating materials, adhesives or sealing compounds. The coating materials, adhesives, and sealing compounds of the invention were easy to apply. In particular, the coating materials of the invention displayed uniform leveling and gave scratchproof, tough and elastic coatings which were free from surface defects and from stress cracks and drying cracks. Another particular surprise was the chemical resistance and weathering stability of the coatings, adhesive films, and seals of the invention.

In the context of the present invention, the phrase "completely or substantially free of volatile organic compounds" means that the dispersions of the invention and the nanoparticles, and their aqueous dispersions, have a VOC content of <2, preferably <1, more preferably <0.5, and with particular preference <0.1% by weight, based in each case on the dispersion. In particular, the amount is below the gas-chromatographic detection limits.

Regarding the terms "hydrophilic" and "hydrophobic", attention is drawn to Römpp Lexikon Lacke und Druckfarben, Georg Thieme Verlag, Stuttgart, New York, 1998, page 294, "hydrophilicity" and pages 294 and 295, "hydrophobicity".

Actinic radiation means electromagnetic radiation, such as near infrared, visible light, UV radiation or X-rays, especially UV radiation, or corpuscular radiation such as electron beams.

DETAILED DESCRIPTION OF THE PREFERRED EMBODIMENTS

A key constituent of the dispersions of the invention comprises hydrophilic nanoparticles.

The nanoparticles are preferably selected from the group consisting of nanoparticles based on silica, alumina, zinc oxide, zirconium oxide, and the polyacids and heteropolyacids of transition metals, preferably of molybdenum and tungsten, having a primary particle size <50 nm, preferably from 5 to 50 nm, in particular from 10 to 30 nm. Preferably, the hydrophilic nanoparticles have no flatting effect. With particular preference, nanoparticles based on silica are used.

Particular preference is given to the use of hydrophilic pyrogenic silicas which are nonporous, whose agglomerates and aggregates have a catenated structure, and which are preparable by the flame hydrolysis of silicon tetrachloride in an oxyhydrogen flame. They are sold, for example, by Degussa under the brand name Aerosol®. Particular preference is also given to precipitated waterglasses, such as nano-hectorites, which are sold, for example, by Südchemie under the brand name Optigel® or by Laporte under the brand name Laponite®.

The amount of nanoparticles (B) in the dispersions of the invention may vary widely and is guided by the requirements of the individual case. The amount, based in each case on the solids of the dispersion of the invention, is preferably from 0.1 to 20, more preferably from 0.2 to 15, with particular preference from 0.3 to 12, with very particular preference from 0.4 to 10, and in particular from 0.5 to 8% by weight.

The further key constituent of the dispersions of the invention is at least one block copolymer (A).

The block copolymer (A) is preparable by two-stage or multistage, especially two-stage, free-radical copolymerization of at least one olefinically unsaturated monomer (a) selected from the group consisting of hydrophilic and hydrophobic olefinically unsaturated monomers.

Suitable hydrophilic monomers (a) contain at least one, especially one, functional group (f) selected from the group consisting of (f1) functional groups convertible into anions by neutralizing agents, and anionic groups, or (f2) functional groups convertible into cations by neutralizing agents and/or quaternizing agents, and cationic groups, and (f3) nonionic hydrophilic groups.

The functional groups (f1) are preferably selected from the group consisting of carboxylic acid, sulfonic acid and phosphonic acid groups, acid sulfuric and phosphoric ester groups, and carboxylate, sulfonate, phosphonate, sulfate ester, and phosphate ester groups; the functional groups (f2) are preferably selected from the group consisting of primary, secondary, and tertiary amino groups, primary, secondary, tertiary and quaternary ammonium groups, quaternary phosphonium groups and tertiary sulfonium groups; and the functional groups (f3) are preferably selected from the group consisting of omega-hydroxy- and omega-alkoxy-poly(alkylene oxide)-1-yl groups.

Examples of highly suitable hydrophilic monomers (a) containing functional groups (f1) are acrylic acid, methacrylic acid, ethacrylic acid, crotonic acid, maleic acid, fumaric acid and itaconic acid; olefinically unsaturated sulfonic and phosphonic acids and their partial esters; and mono(meth)acryloyloxyethyl maleate, mono(meth)acryloyloxyethyl succinate, and mono(meth)acryloyloxyethyl phthalate, especially acrylic acid and methacrylic acid.

Examples of highly suitable hydrophilic monomers (a) containing functional groups (f2) are 2-aminoethyl acrylate and methacrylate, and allylamine.

Examples of highly suitable hydrophilic monomers (a) containing functional groups (f3) are omega-hydroxy- and omega-methoxy-polyethylene oxide-1-yl, omega-methoxy-polypropylene oxide-1-yl, and omega-methoxy-poly(ethylene oxide-co-polypropylene oxide)-1-yl acrylate and methacrylate.

When selecting the hydrophilic monomers (a) care should be taken to ensure that the hydrophilic monomers (a) containing functional groups (f1) and the hydrophilic monomers (a) containing functional groups (f2) are not combined with one another, since this may lead to the formation of insoluble salts and polyelectrolyte complexes. In contrast, the hydrophilic monomers (a) containing functional groups (f1) or containing functional groups (f2) may be combined as desired with the hydrophilic monomers (a) containing functional groups (f3).

Of the hydrophilic monomers (a) described above, the monomers (a) containing the functional groups (f1) are used with particular preference.

Preferably, the neutralizing agents for the functional groups (f1) convertible into anions are selected from the group consisting of ammonia, trimethylamine, triethylamine, tributylamine, dimethylaniline, diethylaniline, triphenylamine, dimethylethanolamine, diethylethanolamine, methyldiethanolamine, 2-aminomethylpropanol, dimethylisopropylamine, dimethylisopropanolamine, triethanolamine, diethylenetriamine and triethylenetetramine, and the neutralizing agents for the functional groups (f2) convertible into cations are selected from the group consisting of sulfuric acid, hydrochloric acid, phosphoric acid, formic acid, acetic acid, lactic acid, dimethylolpropionic acid, and citric acid.

Examples of suitable hydrophobic olefinically unsaturated monomers (a) are (1) esters of olefinically unsaturated acids, said esters being substantially free of acid groups, such as (meth)acrylic, crotonic, ethacrylic, vinylphosphonic or vinylsulfonic alkyl or cycloalkyl esters having up to 20 carbon atoms in the alkyl radical, especially methyl, ethyl, propyl, n-butyl, sec-butyl, tert-butyl, hexyl, ethylhexyl, stearyl, and lauryl acrylate, methacrylate, crotonate, ethacrylate or vinylphosphonate or vinylsulfonate; cycloaliphatic (meth)acrylic, crotonic, ethacrylic, vinylphosphonic or vinylsulfonic esters, especially cyclohexyl, isobornyl, dicyclopentadienyl, octahydro-4,7-methano-1H-indenemethanol or tert-butylcyclohexyl (meth)acrylate, crotonate, ethacrylate, vinylphosphonate or vinylsulfonate. In minor amounts, these monomers may include more highly functional alkyl or cycloalkyl esters of (meth)acrylic acid, crotonic acid or ethacrylic acid, such as ethylene glycol, propylene glycol, diethylene glycol, dipropylene glycol, butylene glycol, pentane-1,5-diol, hexane-1,6-diol, octahydro-4,7-methano-1H-indenedimethanol or cyclohexane-1,2-, -1,3- or -1,4-diol di(meth)acrylate; trimethylolpropane tri(meth)acrylate; or pentaerythritol tetra(meth)acrylate, and the analogous ethacrylates or crotonates. In the context of the present invention, minor amounts of more highly functional monomers (1) are amounts which do not lead to crosslinking or gelling of the block copolymers (A), unless they are intended to be in the form of crosslinked microgel particles;

(2) monomers which carry at least one hydroxyl group or hydroxymethylamino group per molecule and are substantially free of acid groups, such as hydroxyalkyl esters of alpha,beta-olefinically unsaturated carboxylic acids, such as hydroxyalkyl esters of acrylic acid, methacrylic acid and ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate or ethacrylate; 1,4-bis(hydroxymethyl)-cyclohexane, octahydro-4,7-methano-1H-indenedimethanol or methylpropanediol monoacrylate, monomethacrylate, monoethacrylate or monocrotonate; or reaction products of cyclic esters, such as epsilon-caprolactone, and these hydroxyalkyl esters;

olefinically unsaturated alcohols such as allyl alcohol;

allyl ethers of polyols, such as trimethylol-propane monoallyl ether or pentaerythritol monoallyl, diallyl or triallyl ether. The monomers (2) of higher functionality are generally used only in minor amounts. In the context of the present invention, minor amounts of more highly functional monomers are those amounts which do not lead to crosslinking or gelling of the block copolymers (A), unless they are intended to be in the form of crosslinked microgel particles;

reaction products of alpha, beta-olefinically unsaturated carboxylic acids with glycidyl esters of an alpha-branched monocarboxylic acid having from 5 to 18 carbon atoms in the molecule. The reaction of acrylic or methacrylic acid with the glycidyl ester of a carboxylic acid having a tertiary alpha carbon atom may take place before, during or after the polymerization reaction. As component (a1) it is preferred to use the reaction product of acrylic acid and/or methacrylic acid with the glycidyl ester of Versatic® acid. This glycidyl ester is available commercially under the name Cardura® E10. For further details, attention is drawn to Römpp Lexikon Lacke und Druckfarben, Georg Thieme Verlag, Stuttgart, New York, 1998, pages 605 and 606;

formaldehyde adducts of aminoalkyl esters of alpha,beta-olefinically unsaturated carboxylic acids and alpha, beta-unsaturated carboxamides, such as N-methylol- and N,N-dimethylol-aminoethyl acrylate, -aminoethyl methacrylate, -acrylamide, and -methacryl-amide; and also olefinically unsaturated monomers containing acryloxysilane groups and hydroxyl groups, preparable by reacting hydroxy-functional silanes with epichlorohydrin and then reacting the intermediate with an alpha,beta-olefinically unsaturated carboxylic acid, especially acrylic acid and methacrylic acid, or hydroxyalkyl esters thereof;

(3) vinyl esters of alpha-branched monocarboxylic acids having from 5 to 18 carbon atoms in the molecule, such as the vinyl esters of Versatic® acid, which are sold under the brand name VeoVa®;

(4) cyclic and/or acyclic olefins, such as ethylene, propylene, but-1-ene, pent-1-ene, hex-1-ene, cyclohexene, cyclopentene, norbornene, butadiene, isoprene, cyclopentadiene and/or dicyclopentadiene;

(5) amides of alpha, beta-olefinically unsaturated carboxylic acids, such as (meth)acrylamide, N-methyl-, N,N-dimethyl-, N-ethyl-, N,N-diethyl-, N-propyl-, N,N-dipropyl-, N-butyl-, N,N-dibutyl- and/or N,N-cyclohexyl-methyl (meth)acrylamide;

(6) monomers containing epoxide groups, such as the glycidyl ester of acrylic acid, methacrylic acid, ethacrylic acid, crotonic acid, maleic acid, fumaric acid and/or itaconic acid;

(7) vinylaromatic hydrocarbons, such as styrene, vinyltoluene or alpha-alkylstyrenes, especially alpha-methylstyrene;

(8) nitriles, such as acrylonitrile or methacrylonitrile;

(9) vinyl compounds, selected from the group consisting of vinyl halides such as vinyl chloride, vinyl fluoride, vinylidene dichloride, and vinylidene difluoride; vinylamides, such as N-vinylpyrrolidone; vinyl ethers such as ethyl vinyl ether, n-propyl vinyl ether, isopropyl vinyl ether, n-butyl vinyl ether, isobutyl vinyl ether, and vinyl cyclohexyl ether; and also vinyl esters such as vinyl acetate, vinyl propionate, and vinyl butyrate;

(10) allyl compounds selected from the group consisting of allyl ethers and allyl esters, such as propyl allyl ether, butyl allyl ether, ethylene glycol diallyl ether, and trimethylolpropane triallyl ether, and allyl acetate and allyl propionate; regarding the monomers of higher functionality, the comments made above apply analogously;

(11) polysiloxane macromonomers having a number average molecular weight Mn of from 1,000 to 40,000 and containing on average from 0.5 to 2.5 ethylenically unsaturated double bonds per molecule, especially polysiloxane macromonomers having a number average molecular weight Mn of from 2,000 to 20,000, with particular preference from 2,500 to 10,000, and in particular from 3,000 to 7,000 and containing on average from 0.5 to 2.5, preferably from 0.5 to 1.5, ethylenically unsaturated double bonds per molecule, as are described in DE 38 07 571 A 1 on pages 5 to 7, in DE 37 06 095 A 1 in columns 3 to 7, in EP 0 358 153 B 1 on pages 3 to 6, in U.S. Pat. No. 4,754,014 A 1 in columns 5 to 9, in DE 44 21 823 A 1, or in the international patent application WO 92/22615 on page 12 line 18 to page 18 line 10; and

(12) monomers containing carbamate or allophanate groups, such as acryloyloxy- or methacryloyloxy-ethyl, -propyl or -butyl carbamate or allophanate; further examples of suitable monomers containing carbamate groups are described in the patents U.S. Pat. No. 3,479,328 A 1, U.S. Pat. No. 3,674,838 A 1, U.S. Pat. No. 4,126,747 A 1, U.S. Pat. No. 4,279,833 A 1 and U.S. Pat. No. 4,340,497 A 1.

As monomers (b) compounds of the general formula I are used.

In the general formula I the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals.

Examples of suitable alkyl radicals are methyl, ethyl, propyl, isopropyl, n-butyl, isobutyl, tert-butyl, amyl, hexyl, and 2-ethylhexyl.

Examples of suitable cycloalkyl radicals are cyclobutyl, cyclopentyl, and cyclohexyl.

Examples of suitable alkylcycloalkyl radicals are methylenecyclohexane, ethylenecyclohexane, and propane-1,3-diylcyclohexane.

Examples of suitable cycloalkylalkyl radicals are 2-, 3-, and 4-methyl-, -ethyl-, -propyl-, and -butylcyclohex-1-yl.

Examples of suitable aryl radicals are phenyl, naphthyl, and biphenylyl.

Examples of suitable alkylaryl radicals are benzyl and ethylene- and propane-1,3-diylbenzyl.

Examples of suitable cycloalkylaryl radicals are 2-, 3- and 4-phenylcyclohex-1-yl.

Examples of suitable arylalkyl radicals are 2-, 3-, and 4-methyl-, -ethyl-, -propyl-, and -butylphen-1-yl.

Examples of suitable arylcycloalkyl radicals are 2-, 3- and 4-cyclohexylphen-1-yl.

The above-described radicals $R^1$, $R^2$, $R^3$ and $R^4$ may be substituted. For this purpose, electron withdrawing or electron donating atoms or organic radicals may be used.

Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl, arylalkyl, and arylcycloalkyl radicals, including those exemplified above, especially tert-butyl; aryloxy, alkyloxy, and cycloalkyloxy radicals, especially phenoxy, naphthoxy, methoxy, ethoxy, propoxy, butyloxy or cyclohexyloxy; arylthio, alkylthio, and cycloalkylthio radicals, especially phenylthio, naphthylthio, methylthio, ethylthio, propylthio, butylthio, and cyclohexylthio; hydroxyl groups; and/or primary, secondary and/or tertiary amino groups, especially amino, N-methylamino, N-ethylamino, N-propylamino, N-phenylamino, N-cyclohexylamino, N,N-dimethylamino, N,N-diethylamino, N,N-dipropylamino, N,N-diphenylamino, N,N-dicyclohexylamino, N-cyclohexyl-N-methylamino or N-ethyl-N-methylamino.

Examples of monomers (b) used with particular preference in accordance with the invention are diphenylethylene, dinaphthaleneethylene, cis- and trans-stilbene, vinylidenebis (4-N,N-dimethylamino-benzene), vinylidenebis(4-aminobenzene) and vinylidenebis(4-nitrobenzene).

In accordance with the invention, the monomers (b) may be used individually or as a mixture of at least two monomers (b).

With regard to the reaction regime and the properties of the resulting block copolymers (A), diphenylethylene is of very particular advantage and is therefore used with very particular preference in accordance with the invention.

Each of the abovementioned monomers (a) may be polymerized on its own with the monomer (b). In accordance with the invention, however, it is of advantage to use at least two monomers (a), since by this means the profile of properties of the resulting copolymers (A) may, in a particularly advantageous manner, be varied very broadly and custom-tailored to the respective end use of the dispersions of the invention. The monomers (a) are preferably selected so that the profile of properties of the block copolymers (A) is substantially determined by the above-described (meth) acrylate monomers, with the monomers (a) from other classes broadly and purposely varying this profile of properties in an advantageous manner. By this means, in particular, functional groups by means of which the block copolymers (A) become hydrophilic, so that they can be dissolved or dispersed in aqueous media, are incorporated into the block copolymers (A). It is also possible to incorporate reactive functional groups which are able to enter into thermal crosslinking reactions with the complementary reactive functional groups, described below, of any crosslinking agents used. Moreover, it is possible to build on functional groups which give the block copolymers (A) self-crosslinking properties, such as N-methylol or N-alkoxymethyl groups.

The block copolymer (A) may therefore contain at least one, preferably at least two, reactive functional groups which are able to enter into thermal crosslinking reactions with complementary reactive functional groups of the crosslinking agents described below, where used. These reactive functional groups may be incorporated into the block copolymers (A) by way of the monomers (a), or may be introduced by means of polymer-analogous reactions following the synthesis of said copolymers.

Examples of suitable complementary reactive functional groups for use in accordance with the invention that enter into crosslinking reactions are compiled in the overview below. In the overview, the variable $R^5$ stands for substituted or unsubstituted alkyl, cycloalkyl, alkylcycloalkyl, cycloalkylalkyl, aryl, alkylaryl, cycloalkylaryl, arylalkyl or arylcycloalkyl radicals; the variables $R^6$ and $R^7$ stand for identical or different alkyl, cycloalkyl, alkylcycloalkyl or cycloalkylalkyl radicals or are linked with one another to form an aliphatic or heteroaliphatic ring. Examples of suitable such radicals are those recited above in connection with the radicals $R^1$, $R^2$, $R^3$ and $R^4$.

radiation, and secondly by the temperature range within which thermal curing is to take place.

In this context, especially with regard to thermally sensitive substrates such as plastics, it is of advantage in accordance with the invention to choose a temperature range which does not exceed 100° C., and in particular 80° C. In the light of these boundary conditions, hydroxyl groups and isocyanate groups, or carboxyl groups and epoxy groups, have proven advantageous complementary reactive functional groups, and so are employed with preference in accordance with the invention in the dispersions of the invention or coating materials, adhesives, and sealing compounds that are in the form of two-component or multicomponent systems.

Where higher crosslinking temperatures, of for example from 100 to 180° C., are employed, one-component systems are also suitable; in these systems, the reactive functional groups are preferably thio, amino, hydroxyl, carbamate, allophanate, carboxyl and/or (meth)acrylate groups, but especially hydroxyl groups, and the complementary reactive functional groups are preferably anhydride, carboxyl, epoxy, blocked isocyanate, urethane, methylol, methylol ether, siloxane, amino, hydroxyl and/or beta-hydroxyalkylamide groups.

The block copolymer (A) and, respectively, the dispersion of the invention prepared using it may, however, also film without a crosslinking agent and form exceptional coatings, adhesive films, and seals. In this case, the block copolymer (A) and, respectively, the dispersion are physically curing. In the context of the present invention, physical curing and curing by way of the above-described complementary reactive functional groups are collected together under the generic term "thermal curing".

Overview: Examples of complementary functional groups in the
Block copolymer (A) and crosslinking agent
or
Crosslinking agent and block copolymer (A)

| | |
|---|---|
| —SH | —C(O)—OH |
| —NH$_2$ | —C(O)—O—C(O)— |
| —OH | —NCO |
| —O—(CO)—NH—(CO)—NH$_2$ | —NH—C(O)—OR$^5$ |
| —O—(CO)—NH$_2$ | —CH$_2$—OH |
| | —CH$_2$—O—CH$_3$ |
| | —NH—C(O)—CH(—C(O)OR$^5$)$_2$ |
| | —NH—C(O)—CH(—C(O)OR$^5$)(—C(O)—R$^5$) |
| | —NH—C(O)—NR$^6$R$^7$ |
| | >Si(OR$^5$)$_2$ |
| | $\overset{O}{\underset{\diagup\ \diagdown}{\text{—CH—CH}_2}}$ |
| —C(O)—OH | $\overset{O}{\underset{\diagup\ \diagdown}{\text{—CH—CH}_2}}$ |
| —O—(O)—CR$^5$=CH$_2$ | —OH |
| —O—CR=CH$_2$ | —NH$_2$ |
| | —C(O)—CH$_2$—C(O)—R$^5$ |
| | —CH=CH$_2$ |

The selection of the respective complementary reactive functional groups is guided firstly by the consideration that during the storage of the dispersions of the invention they should not enter into any unwanted reactions and should not disrupt or inhibit any curing of the dispersions of the invention, and of the coating materials, adhesives, and sealing compounds prepared from them, with actinic The block copolymers (A) are preferably prepared by reacting, in a first stage (i), at least one monomer (b) with at least one hydrophilic monomer (a) to form a copolymer or macroinitiator. This copolymer or this macroinitiator is then, in a further stage (ii) following its isolation or directly in the reaction mixture, preferably directly in the reaction mixture, reacted with at least one further, preferably hydrophobic, monomer (a) under free-radical conditions. The reaction is preferably carried out in the absence of a free-radical polymerization initiator.

Alternatively, stages (i) and (ii) may also be conducted in succession in one reactor. For this purpose, first of all the monomer (b) is reacted with at least one monomer (a), completely or partly, depending on the desired application and desired properties, after which at least one further monomer (a) is added and the mixture is subjected to free-radical polymerization. In another embodiment, at least two monomers (a) are used from the start, with the monomer (b) reacting first with one of the at least two monomers (a) and then the resulting copolymer, above a certain molecular weight, also reacting with the further monomer (a).

Preferably, the weight ratio of the copolymer or macroinitiator formed in the first stage (i) to the further monomer (s) (a) of the further stage(s) (ii) is from 1:25 to 5:1, more preferably from 1:22 to 4:1, with particular preference from 1:18 to 3:1, with very particular preference from 1:16 to 2:1, and in particular from 1:15 to 1:1.

Depending on reaction regime it is possible to prepare block copolymers (A) having block, multiblock, gradient (co)polymer, star, and branched structures, with or without functionalization on the end groups.

Examples of free-radical polymerization initiators which may be used include the following: dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; potassium, sodium or ammonium peroxodisulfates; azo dinitriles such as azobisiso-butyronitrile; C—C-cleaving initiators such as benzpinacol silyl ethers; or a combination of a non-oxidizing initiator with hydrogen peroxide. Further examples of suitable initiators are described in the German patent application DE 196 28 142 A1, page 3 line 49 to page 4 line 6.

It is preferred to add comparatively large amounts of free-radical initiator, with the fraction of the initiator in the reaction mixture, based in each case on the overall amount of the monomers (a) and (b) and the initiator, being with particular preference from 0.5 to 50% by weight, with very particular preference from 1 to 20% by weight, and in particular from 2 to 15% by weight.

The weight ratio of initiator to monomers (b) is preferably from 4:1 to 1:4, with particular preference from 3:1 to 1:3, and in particular from 2:1 to 1:2. Further advantages result if the initiator is used in excess within the stated limits.

The two-stage or multistage free-radical copolymerization or block copolymerization is conducted in an aqueous medium.

The aqueous medium comprises substantially water. Said aqueous medium may contain minor amounts of the additives detailed below and/or other dissolved solid, liquid or gaseous, low and/or high molecular mass substances, especially bases, provided these do not adversely affect, let alone inhibit, the copolymerization and/or do not lead to the emission of volatile organic compounds. In the context of the present invention, the term "minor amount" means an amount which does not destroy the aqueous nature of the aqueous medium. This aqueous medium may, however, also be water alone.

Examples of suitable bases are low molecular mass bases such as sodium hydroxide solution, potassium hydroxide solution, ammonia, diethanolamine, triethanolamine, mono-, di-, and triethylamine, and/or dimethylethanolamine, especially ammonia and/or di- and/or triethanolamine.

Suitable reactors for the (co)polymerization processes are the customary and known stirred tanks, stirred tank cascades, tube reactors, loop reactors or Taylor reactors, as described for example in the patents DE 198 28 742 A 1 and EP 0 498 583 A 1 or in the article by K. Kataoka in Chemical Engineering Science, Volume 50, No. 9, 1995, pages 1409 to 1416. The free-radical copolymerization is preferably conducted in stirred tanks or Taylor reactors, the Taylor reactors being designed so that the conditions of Taylor flow are met over the entire length of the reactor, even if there is a sharp change—especially an increase—in the kinematic viscosity of the reaction medium owing to copolymerization (cf. the German patent application DE 198 28 742 A 1).

The copolymerization is advantageously conducted at temperatures above room temperature and below the lowest decomposition temperature of the respective monomers used, preference being given to the choice of the temperature range from 10 to 150° C., with very particular preference from 50 to 120° C., and in particular from 55 to 110° C.

When using particularly volatile monomers (a) and/or (b), the copolymerization may also be conducted under pressure, preferably under from 1.5 to 3,000 bar, more preferably from 5 to 1,500 bar, and in particular from 10 to 1,000 bar.

As far as the molecular weight distributions are concerned, the block copolymer (A) is not subject to any restrictions whatsoever. Advantageously, however, the copolymerization is conducted so as to give a molecular weight distribution Mw/Mn, measured by gel permeation chromatography using polystyrene as standard, of $\leq 4$, preferably $\leq 3$, with particular preference $\leq 2$, and in particular $\leq 1.5$, and, in certain cases, even $\leq 1.3$. The molecular weights of the block copolymers (A) can be controlled within wide limits through the choice of the ratio of monomer (a) to monomer (b) to free-radical initiator. In this relationship, it is the amount of monomer (b) in particular that determines the molecular weight, specifically such that, the greater the fraction of monomer (b), the lower the molecular weight obtained.

The fraction of the block copolymers (A) for use in accordance with the invention in the dispersions of the invention may vary very widely. Advantageously, the fraction is from 85 to 99.9, preferably from 88 to 99.8, more preferably from 90 to 99.7, with particular preference from 92 to 99.6, and in particular from 93 to 99.5% by weight, based in each case on the solids of the dispersion of the invention.

Besides the block copolymers (A) and the nanoparticles (B), the dispersion of the invention may further comprise customary and known additives. Additives used are only those which do not consist of or comprise volatile organic compounds. Additionally, the selection of the additives is guided by whether the dispersions, coating materials, adhesives, and sealing compounds of the invention are to be pigmented or not. The skilled worker will therefore be able to select the additives suited to the case in hand on the basis of his or her general knowledge in the art, possibly with the aid of preliminary rangefinding tests.

Examples of suitable additives for pigmented dispersions, coating materials, adhesives, and sealing compounds of the invention are color and/or effect pigments, fluorescent pigments, electrically conductive pigments and/or magnetically shielding pigments, metal powders, soluble organic dyes, and/or organic and inorganic, transparent or opaque fillers.

Examples of suitable additives for pigmented and unpigmented dispersions, coating materials, adhesives, and sealing compounds of the invention are crosslinking agents, binders curable thermally or with actinic radiation and different than the block copolymers (A), absorbers, light stabilizers, such as UV absorbers or free-radical scavengers, devolatilizers, slip additives, polymerization inhibitors, crosslinking catalysts, thermolabile free-radical initiators, photoinitiators, antioxidants, defoamers, emulsifiers, wetting agents, dispersants, adhesion promoters, leveling agents, film formation auxiliaries, sag control agents (SCAs), rheology control additives (thickeners), flame retardants, corrosion inhibitors, free-flow aids, waxes and/or flatting agents.

The additives may be employed individually or as mixtures.

Examples of suitable effect pigments are metal flake pigments such as commercially customary aluminum bronzes, aluminum bronzes chromated in accordance with DE 36 36 183 A 1, and commercially customary stainless steel bronzes, and also nonmetallic effect pigments, such as pearlescent and interference pigments, for example, platelet-shaped effect pigments based on aluminum oxide with a color from pink to brownish red, or liquid-crystalline effect pigments. For further details, attention is drawn to Römpp Lexikon Lacke und Druckfarben, Georg Thieme Verlag, 1998, page 176, "effect pigments" and pages 380 and 381, "metal oxide-mica pigments" to "metal pigments", and to the patent applications and patents DE 36 36 156 A 1, DE 37 18 446 A 1, DE 37 19 804 A 1, DE 39 30 601 A 1, EP 0 068 311 A 1, EP 0 264 843 A 1, EP 0 265 820 A 1, EP 0 283 852 A 1, EP 0 293 746 A 1, EP 0 417 567 A 1, U.S. Pat. No. 4,828,826 A, and U.S. Pat. No. 5,244,649 A.

Examples of suitable inorganic colored pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black.

For further details, attention is drawn to Römpp Lexikon Lacke und Druckfarben, Georg Thieme Verlag, 1998, pages 180 and 181, "iron blue pigments" to "black iron oxide", pages 451 to 453, "pigments" to "pigment volume concentration", page 563, "thioindigo pigments", page 567, "titanium dioxide pigments", pages 400 and 467, "naturally occurring pigments", page 459, "polycyclic pigments", page 52, "azomethine pigments", "azo pigments", and page 379, "metal complex pigments".

Examples of fluorescent pigments (daylight-fluorescent pigments) are bis(azomethine) pigments.

Examples of suitable electrically conductive pigments are titanium dioxide/tin oxide pigments.

Examples of magnetically shielding pigments are pigments based on iron oxides or chromium dioxide.

Examples of suitable metal powders are powders of metals and metal alloys such as aluminum, zinc, copper, bronze or brass.

Suitable soluble organic dyes are lightfast organic dyes having little or no tendency to migrate from the coating material of the invention or the coatings produced from it. The skilled worker is able to estimate the migration tendency on the basis of his or her general knowledge in the art and/or determine it using simple preliminary rangefinding tests, as part of tinting experiments, for example.

Examples of suitable organic and inorganic fillers are chalk, calcium sulfates, barium sulfate, silicates such as talc, mica or kaolin, silicas, oxides such as aluminum hydroxide or magnesium hydroxide, or organic fillers such as polymer powders, especially those of polyamide or polyacrylonitrile. For further details, attention is drawn to Römpp Lexikon Lacke und Druckfarben, Georg Thieme Verlag, 1998, pages 250 ff., "Fillers".

It is preferred to employ mica and talc if the intention is to enhance the scratch resistance of the coatings produced from the coating materials of the invention.

It is further advantageous to use mixtures of platelet-shaped organic fillers such as talc or mica and nonplatelet-shaped inorganic fillers such as chalk, dolomite, calcium sulfates, or barium sulfate, since by this means the viscosity and the rheology may be adjusted very effectively.

Examples of suitable crosslinking agents for two-component or multicomponent systems are polyisocyanates.

The polyisocyanates contain or average at least 2.0, preferably more than 2.0, and in particular more than 3.0 isocyanate groups per molecule. There is in principle no upper limit on the number of isocyanate groups; in accordance with the invention, however, it is of advantage if the number does not exceed 15, preferably 12, with particular preference 10, with further particular preference 8.0, and in particular 6.0.

Examples of suitable polyisocyanates are isocyanato-containing polyurethane prepolymers which can be prepared by reacting polyols with an excess of diisocyanates and are preferably of low viscosity.

Examples of suitable diisocyanates are isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl) cyclohexane, 1-isocyanato-2-(4-isocyanatobut-1-yl) cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate (HDI), ethylethylene diisocyanate, trimethylhexane diisocyanate, heptamethylene diisocyanate or diisocyanates derived from dimer fatty acids, as sold under the commercial designation DDI 1410 by Henkel and described in the patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanato-prop-1-yl)cyclohexane, 1,2-, 1,4- or 1,3-bis(4-isocyanatobut-1-yl)cyclohexane or liquid bis(4-isocyanatocyclohexyl)methane with a trans/trans content of up to 30% by weight, preferably 25% by weight, and in particular 20% by weight, as described by the patent applications DE 44 14 032 A 1, GB 1220717 A 1, DE 16 18 795 A 1, and DE 17 93 785 A 1, preferably isophorone diisocyanate, 5-isocyanato-1-(2-isocyanatoeth-1-yl)-1,3,3-trimethylcyclohexane, 5-isocyanato-1-(3-isocyanatoprop-1-yl)-1,3,3-trimethyl cyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane or HDI, especially HDI.

It is also possible to use polyisocyanates containing isocyanurate, biuret, allophanate, iminooxadiazine-dione, urethane, urea, carbodiimide and/or uretdione groups, these polyisocyanates being prepared in conventional manner from the above-described diisocyanates. Examples of suitable preparation processes and polyisocyanates are known, for example, from the patents CA 2,163,591 A, U.S. Pat. No. 4,419,513, U.S. Pat. No. 4,454,317 A, EP 0 646 608 A, U.S. Pat. No. 4,801,675 A, EP 0 183 976 A 1, DE 40 15 155 A 1, EP 0 303 150 A 1, EP 0 496 208 A 1, EP 0 524 500 A 1, EP 0 566 037 A 1, U.S. Pat. No. 5,258,482 A 1, U.S. Pat. No. 5,290,902 A 1, EP 0 649 806 A 1, DE 42 29 183 A 1 and EP 0 531 820 A 1.

Further examples of suitable crosslinking agents are blocked polyisocyanates.

Examples of suitable blocking agents for preparing the blocked polyisocyanates are the blocking agents known from the U.S. Pat. No. 4,444,954 A or U.S. Pat. No. 5,972,189 A, such as i) phenols such as phenol, cresol, xylenol, nitrophenol, chlorophenol, ethylphenol, t-butyl-phenol, hydroxybenzoic acid, esters of this acid, or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate, or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, propylene glycol monomethyl ether, methoxymethanol, 2-(hydroxyethoxy)phenol, 2-(hydroxypropoxy)phenol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, ketoximes, imidazoles or triazoles; and also xvii) mixtures of these blocking agents, especially dimethylpyrazole and triazoles, malonic esters and acetoacetic esters, dimethylpyrazole and succinimide, or butyldiglycol and trimethylol-propane.

Further examples of suitable crosslinking agents are all known aliphatic and/or cycloaliphatic and/or aromatic, low molecular mass, oligomeric and polymeric polyepoxides, based for example on bisphenol A or bisphenol F. Further suitable polyepoxides include, for example, the polyepoxides available commercially under the designations Epikote® from Shell, Denacol® from Nagase Chemicals, Ltd., Japan, such as, for example, Denacol EX-411 (pentaerythritol polyglycidyl ether), Denacol EX-321 (trimethylolpropane polyglycidyl ether), Denacol EX-512 (polyglycerol polyglycidyl ether), and Denacol EX-521 (polyglycerol polyglycidyl ether), or the glycidyl ester of trimellitic acid, or triglycidyl isocyanurate (TGIC).

As crosslinking agents (B) it is also possible to use tris(alkoxycarbonylamino)triazines (TACTs) of the general formula

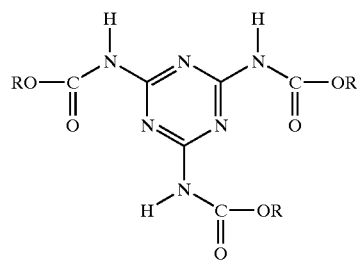

Examples of suitable tris (alkoxycarbonylamino) triazines are described in the patents U.S. Pat. No. 4,939,213 A, U.S. Pat. No. 5,084,541 A, and EP 0 624 577 A 1. Use is made in particular of the tris(methoxy-, tris(butoxy- and/or tris(2-ethylhexoxycarbonylamino)triazines.

The methyl butyl mixed esters, the butyl 2-ethylhexyl mixed esters, and the butyl esters are of advantage. They have the advantage over the straight methyl ester of better solubility in polymer melts, and also have less of a tendency to crystallize out.

Further useful crosslinking agents are amino resins, examples being melamine resins. Any amino resin suitable for transparent topcoats or clearcoats, or a mixture of such amino resins, may be used here. Particularly suitable are the customary and known amino resins some of whose methylol and/or methoxymethyl groups have been defunctionalized by means of carbamate or allophanate groups. Crosslinking agents of this kind are described in the patents U.S. Pat. No. 4,710,542 A and EP-0 245 700 B 1 and also in the article by B. Singh and coworkers, "Carbamylmethylated Melamines, Novel Crosslinkers for the Coatings Industry" in Advanced Organic Coatings Science and Technology Series, 1991, Volume 13, pages 193 to 207. The amino resins may also be used as binders (C).

Further examples of suitable crosslinking agents are beta-hydroxyalkylamides such as N,N,N',N'-tetrakis(2-hydroxyethyl)adipamide or N,N,N',N'-tetrakis(2-hydroxypropyl)adipamide.

It is possible, furthermore, to use carboxylic acids, especially saturated, straight-chain, aliphatic dicarboxylic acids having from 3 to 20 carbon atoms in the molecule, in particular dodecanedioic acid.

Further examples of suitable crosslinking agents are siloxanes, especially siloxanes containing at least one trialkoxysilane or dialkoxysilane group.

Which crosslinking agents specifically are employed is guided by the complementary reactive functional groups present in the block copolymers (A).

Examples of suitable other binders curable with actinic radiation are (meth)acryloyl-functional (meth)acrylic copolymers, polyether acrylates, polyester acrylates, unsaturated polyesters, epoxy acrylates, urethane acrylates, amino acrylates, melamine acrylates, silicone acrylates, isocyanato acrylates, and the corresponding methacrylates. Preference is given to using binders that are free of aromatic structural units. Preference is therefore given to using urethane (meth) acrylates and/or polyester (meth)acrylates, with particular preference aliphatic urethane acrylates. Further examples of suitable additives curable with actinic radiation are known from the German patent DE 197 09 467 C 1.

Examples of suitable other binders curable thermally are linear and/or branched and/or block, comb and/or random poly(meth)acrylates or acrylic copolymers, polyesters, alkyds, polyurethanes, acrylated polyurethanes, acrylated polyesters, polylactones, polycarbonates, polyethers, epoxy resin-amine adducts, (meth)acrylatediols, partially saponified polyvinyl esters, or polyureas, which contain the above-described reactive functional groups.

Examples of suitable thermally curable reactive diluents are positionally isomeric diethyloctanediols or hydroxyl-containing hyperbranched compounds or dendrimers, as described in the patent applications DE 198 09 643 A 1, DE 198 40 605 A 1, and DE 198 05 421 A 1.

Examples of suitable reactive diluents curable by actinic radiation are those described in Römpp Lexikon Lacke und Druckfarben, Georg Thieme Verlag, Stuttgart, New York, 1998, on page 491 under the entry for "reactive diluents".

Examples of suitable thermolabile free-radical initiators are organic peroxides, organic azo compounds or C—C-cleaving initiators such as dialkyl peroxides, peroxocarboxylic acids, peroxodicarbonates, peroxide esters, hydroperoxides, ketone peroxides, azo dinitriles or benzpinacol silyl ethers.

Examples of suitable crosslinking catalysts are bismuth lactate, citrate, ethylhexanoate or dimethylol-propionate, dibutyltin dilaurate, lithium decanoate or zinc octoate, amine-blocked organic sulfonic acids, quaternary ammonium compounds, amines, imidazole and imidazole derivatives such as 2-styrylimidazole, 1-benzyl-2-methylimidazole, 2-methylimidazole, and 2-butylimidazole, as described in the Belgian patent no. 756,693, or phosphonium catalysts such as ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide, tetrabutylphosphonium bromide, and tetrabutylphosphonium acetate-acetic acid complex, as are described, for example, in the U.S. Patents U.S. Pat. No. 3,477,990 A and U.S. Pat. No. 3,341,580 A.

Examples of suitable photoinitiators are described in R ömpp Chemie Lexikon, $9^{th}$, expanded and revised edition, Georg Thieme Verlag, Stuttgart, Vol. 4, 1991, or in Römpp Lexikon Lacke und Druckfarben, Georg Thieme Verlag Stuttgart, 1998, pages 444 to 446.

Examples of suitable antioxidants are hydrazines and phosphorus compounds.

Examples of suitable light stabilizers are HALS compounds, benzotriazoles or oxalanilides.

Examples of suitable free-radical scavengers and polymerization inhibitors are organic phosphites or 2,6-di-tert-butylphenol derivatives.

Examples of suitable devolatilizers are diazadicycloundecane and benzoin.

An example of a suitable adhesion promoter is tricyclodecanedimethanol.

Examples of suitable film formation auxiliaries are cellulose derivatives.

Examples of suitable rheology control additives (C) are those known from the patents WO 94/22968, EP-A-0 276 501, EP-A-0 249 201, and WO 97/12945; crosslinked polymeric microparticles, as disclosed for example in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils; or synthetic polymers containing ionic and/or associative groups, such as polyvinyl alcohol, poly(meth)acrylamide, poly(meth)acrylic acid, polyvinylpyrrolidone, styrene-maleic anhydride copolymers or ethylene-maleic anhydride copolymers and derivatives thereof, or hydrophobically modified ethoxylated urethanes or polyacrylates.

Further examples of the additives recited above and of additional additives can be found in the textbook "Lackadditive" [Additives for coatings] by Johan Bieleman, Wiley-VCH, Weinheim, New York, 1998.

The preparation of the dispersions of the invention from the above-described block copolymers (A) and from the nanoparticles (B) and also, if desired, from at least one of the above-described additives may take place in any suitable way. Preferably, the dispersions of the invention are prepared by means of the process of the invention.

The process of the invention starts from the preparation of the dispersion of the block copolymer (A), as described above. Subsequently, at least one, especially one, kind of the above-described hydrophilic nanoparticles (B) is dispersed into the aforementioned dispersion.

For the dispersive incorporation, it is preferred to prepare an aqueous dispersion, entirely or substantially free of VOCs, of at least one kind, especially one kind, of hydrophilic nanoparticles (B). For this purpose, the nanoparticles (B) are dispersed in an aqueous medium by wet grinding. Grinding is carried out using customary and known devices such as stirred mills or laboratory mills, and using customary and known grinding media such as glass beads. Subsequently, the two aqueous dispersions (A) and (B) are mixed with one another in the desired proportion, using customary and known devices, such as stirred tanks, dissolvers, including inline dissolvers, stirred mills, laboratory mills, or Ultraturrax. Preferably, the resulting dispersion of the invention is filtered prior to its appropriate use.

The dispersions of the invention are outstandingly suitable as, or for preparing, coating materials, adhesives, and sealing compounds. Without emitting volatile organic compounds, the coating materials, adhesives, and sealing compounds of the invention provide coatings, adhesive films, and seals having excellent performance properties.

The dispersions of the invention display particular advantages when used as, or to prepare, coating materials. The coating materials of the invention may be used as primer-surfacers, antistonechip primers, aqueous basecoat materials, solid-color topcoat materials, or clearcoat materials. Without emitting volatile organic compounds, these coating materials of the invention provide outstanding primer-surfacer coats, basecoats or clearcoats and also multicoat color and/or effect coating systems having excellent performance properties. The coating materials of the invention display very particular advantages when used as clearcoat materials.

In terms of its method, the application of the coating materials, adhesives, and sealing compounds of the invention have no special features and, indeed, may take place by any customary application method, such as spraying, knifecoating, brushing, flowcoating, dipping, trickling or rolling, for example.

Suitable substrates are all those which are undamaged by curing of the coats present thereon or therein using heat and, if appropriate, actinic radiation, such as metals, plastics, wood, ceramic, stone, textile, fiber assemblies, leather, glass, glass fibers, glass wool, rockwool, mineral- and resin-bound building materials, such as plasterboard and cement slabs or roof tiles, and also assemblies of all these materials.

Accordingly, the coating materials, adhesives, and sealing compounds of the invention can be used to coat, bond, and seal motor vehicle bodies and parts thereof, buildings inside and outside, doors, windows, and furniture, and for coating, bonding, and sealing in the context of industrial coating, including coils, containers, electrical components, such as motor windings or transformer windings, and white goods, including domestic appliances, boilers, and radiators.

In the case of electrically conductive substrates it is possible to use primers produced in a customary and known manner from electrodeposition coating materials. For this purpose, both anodic and cathodic electrodeposition coating materials are suitable, but especially cathodic materials.

It is also possible to coat, bond, or seal primed or unprimed plastics parts made, for example, of ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM, and UP (abbreviated codes in accordance with DIN 7728T1). Unfunctionalized and/or nonpolar substrate surfaces may be subjected prior to coating in a known manner to a pretreatment, such as with a plasma or by flaming, or may be provided with a water-based primer.

The curing of the applied coating materials, adhesives, and sealing compounds of the invention also has no special features in terms of its method but instead takes place in accordance with customary and known thermal methods such as heating in a forced air oven or irradiation with IR lamps, which may be supplemented by exposure to actinic radiation (dual cure). In this case use may be made of radiation sources such as high or low pressure mercury vapor lamps, with or without lead doping in order to open up a radiation window of up to 405 nm, or electron beam sources.

The resulting coatings of the invention, especially the single-coat or multicoat color and/or effect coating systems and clearcoats of the invention, are easy to produce and, even under extreme climatic conditions, possess outstanding optical properties and very high chemical resistance, weathering stability, and scratch resistance. They can therefore be used both inside and outside.

The adhesive films and seals of the invention produced from the adhesives and sealing compounds of the invention also have outstanding bond strength and sealing capacity, even under extreme climatic conditions and over long periods of time. They can also be used both inside and outside.

Consequently, the primed and unprimed substrates of the invention, especially bodies of automobiles and commercial vehicles, industrial components, including plastics parts, packaging, coils, white goods, and electrical components, or furniture, which have been coated with at least one coating of the invention, sealed with at least one seal of the invention and/or bonded with at least one adhesive of the invention, are also notable for particular technical and economic advantages, in particular a long service life, which makes them particularly attractive to users.

EXAMPLES

Preparation Example 1

The Preparation of a Copolymer (Macroinitiator)

A steel reactor as commonly used to prepare dispersions, equipped with a stirrer, a reflux condenser, and 3 feed vessels, was charged with 1591.1 parts by weight of deionized water and this initial charge was heated to 70° C. 308.2 parts by weight of acrylic acid, 555.2 parts by weight of methyl methacrylate and 45.2 parts by weight of diphenylethylene were charged to the first feed vessel. 300.1 parts by weight of 25 percent strength ammonia solution were charged to the second feed vessel 159 parts by weight of deionized water and 68.2 parts by weight of ammonium peroxodisulfate were charged to the third feed vessel. The three feeds were commenced simultaneously with intensive stirring of the initial charge in the steel reactor. The first and second feeds were metered in over the course of four hours. The third feed was metered in over the course of 4.5 hours. The resulting reaction mixture was held at 70° C. for four hours and then cooled to below 40° C. and filtered through a 100 μm GAF bag. The resulting dispersion had a solids content of 33% by weight (1 hour, 130° C.) and a free monomer content of less than 0.2% by weight (determined by gas chromatography).

The dispersion was used to prepare a block copolymer (A).

Preparation Example 2

The Preparation of a Dispersion of a Block Copolymer (A)

A steel reactor as commonly used to prepare dispersions, equipped with a stirrer, a reflux condenser, and one feed vessel, was charged with 1361.7 parts by weight of deionized water and 240 parts by weight of the dispersion from preparation example 1 and this initial charge was heated to 75° C. with stirring. Thereafter, a mixture of 260 parts by weight of n-butyl methacrylate, 208 parts by weight of styrene, 334 parts by weight of hydroxyethyl methacrylate and 234.4 parts by weight of ethylhexyl methacrylate was metered in from the feed vessel over the course of six hours. The resulting reaction mixture was stirred at 75° C. for two hours. The resulting dispersion was subsequently cooled to below 40° C. and filtered through a 50 μm GAF bag. The dispersion (A) had a solids content of 42.3% by weight (1 hour, 130° C.) and a free monomer content of less than 0.2% by weight (determined by gas chromatography).

Preparation Example 3
The Preparation of an Aqueous Dispersion of Nanoparticles (B)

100 parts by weight of pyrogenic silica (Aerosil® 150 from Degussa) were ground in 600 parts by weight of deionized water using 1060 parts by weight of glass beads (SAZ beads, 1.6 to 2.5 mm, pretreated) for 30 minutes. The glass beads were then separated off.

Example 1
The Preparation of an Inventive Dispersion 135 parts by weight of the aqueous dispersion (B) from preparation example 3 and 900 parts by weight of the dispersion (A) from preparation example 2 were ground in a laboratory mill using 1725 parts by weight of glass beads (SAZ beads, 1.6 to 2.5 mm, pretreated) for 1.5 hours. Then the glass beads were separated off and the resulting dispersion was filtered through a 30 μm sieve.

The inventive dispersion was stable on storage for months and transportable without problems. It could be used as a coating material, adhesive or sealing compound. It was simple to apply and exhibited excellent leveling. Even on vertical surfaces, there was no running of material.

Example 2
The Use of the Inventive Dispersion as Clearcoat Material

The inventive dispersion of the example was applied to glass plates using a box-type coating bar. The resulting wet films were baked at 140° C. for 20 minutes. This gave clearcoats with a thickness of 40 μm, which exhibited uniform leveling and had a smooth surface, high gloss, and high transparency. The clearcoats were free from turbidity, gel specks, and surface defects such as orange peel structures, craters or pinholes.

The scratch resistance was determined using the Amtec test, known in the art, following aging of the multicoat systems of the invention at room temperature for seven days. The result was a decrease in the degree of gloss (20°) of 20.

The chemical resistance was determined by means of the MB gradient oven test known in the art, following aging of the clearcoats at room temperature for 72 hours. In this test, initial marking was produced by 1% sulfuric acid at 50° C., pancreatin at 48° C., tree resin at 60° C., and deionized water only above 70° C.

What is claimed is:

1. An aqueous dispersion substantially free from volatile organic compounds, comprising
   (A) at least one block copolymer prepared by two-stage or multistage free-radical copolymerization in an aqueous medium of
      a) at least one olefinically unsaturated monomer selected from the group consisting of hydrophilic and hydrophobic olefinically unsaturated monomers, and
      b) at least one olefinically unsaturated monomer different than the olefinically unsaturated monomer (a) and of the general formula $$R^1R^2C=CR^3R^4 \quad (I)$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals; and
   (B) hydrophilic nanoparticles.

2. The dispersion as claimed in claim 1, wherein the block copolymer (A) is prepared by two-stage free-radical block copolymerization.

3. The dispersion as claimed in claim 1, wherein the block copolymer (A) is prepared by
   (i) subjecting in a first stage at least one monomer (a) and at least one monomer (b) to free-radical polymerization in an aqueous medium, and then
   (ii) in at least one further stage, reacting the resulting copolymer with at least one further monomer (a) under free-radical conditions.

4. The dispersion as claimed in claim 1, wherein the block copolymer (A) is prepared by reacting in the first stage (i) at least one monomer (b) with at least one hydrophilic monomer (a) to give a copolymer.

5. The dispersion as claimed in claim 3, wherein the block copolymer (A) is prepared by reacting in the at least one further stage (ii) the resulting copolymer with at least one further monomer (a) under free-radical conditions in the absence of a free-radical polymerization initiator.

6. The dispersion as claimed in claim 3, wherein the block copolymer (A) is prepared by reacting in the at least one further stage (ii) the resulting copolymer with at least one hydrophobic monomer (a).

7. The dispersion as claimed in any of claim 1, wherein the aryl radicals $R^1$, $R^2$, $R^3$ and/or $R^4$ of the monomers (b) comprise phenyl or naphthyl radicals.

8. The dispersion as claimed in claim 7, wherein said radicals comprise phenyl radicals.

9. The dispersion as claimed in claim 1, wherein the substituents in one or more of the radicals $R^1$, $R^2$, $R^3$ and $R^4$ of the monomers (b) are selected from the group consisting of electron withdrawing and electron donating atoms and organic radicals.

10. The dispersion as claimed in claim 9, wherein the substituent or substituents are selected from the group consisting of:
    halogen atoms,
    nitrile, nitro, partially and fully halogenated alkyl, cycloalkyl, alkylcycloalkyl, cycloalkylalkyl, aryl, alkylaryl, cycloalkylaryl, arylalkyl, and arylcycloalkyl radicals,
    aryloxy, alkyloxy, and cycloalkyloxy radicals,
    arylthio, alkylthio, and cycloalkylthio radicals, and
    primary, secondary and tertiary amino groups.

11. The dispersion as claimed in claim 1, wherein the monomer (a) is hydrophilic and contains at least one functional group (f) selected from the group consisting of
    (f1) functional groups convertible into anions by neutralizing agents, and anionic groups,
    (f2) functional groups convertible into cations by neutralizing agents and/or quaternizing agents, and cationic groups, and
    (f3) nonionic hydrophilic groups,
    with the proviso that if the monomer contains a functional group (f1) it does not also contain a functional group (f2).

12. The dispersion as claimed in claim 11, wherein the functional groups (f1) are selected from the group consisting of carboxylic acid, sulfonic acid and phosphoric acid groups, acid sulfuric and phosphoric ester groups, and carboxylate, sulfonate, phosphonate, sulfate ester, and phosphate ester groups; the functional groups (f2) are selected from the group consisting of primary, secondary, and tertiary amino groups, primary, secondary, tertiary and quaternary ammonium groups, quaternary phosphonium groups and tertiary sulfonium groups; and the functional groups (f3) are selected from the group consisting of omega-hydroxy- and omega-alkoxy-poly(alkylene oxid)-1-yl groups.

13. The dispersion as claimed in claim 11, wherein the neutralizing agents for the functional groups (f1) convertible into anions are selected from the group consisting of ammonia, trimethylamine, triethylamine, tributylamine, dimethylaniline, diethylaniline, triphenylamine, dimethylethanolamifle, diethylethanolamine, methyldiethanolamine, 2-aminomethylpropanol, dimethylisopropylamine, dimethylisopropanolamine, triethanolamine, diethylenetriamine and triethylenetetramine, and the neutralizing agents for the functional groups (f2) convertible into cations are selected from the group consisting of sulfuric acid, hydrochloric acid, phosphoric acid, formic acid, acetic acid, lactic acid, dimethylolpropionic acid, and citric acid.

14. The dispersion as claimed in claim 1, wherein the monomers (a) comprise a hydrophobic monomer selected from the group consisting of
  (1) esters of olefinically unsaturated acids, said esters being substantially free of acid groups;
  (2) monomers which carry per molecule at least one hydroxyl group or hydroxymethylarniflo group and are substantially free of acid groups;
  (3) vinyl esters of alpha-branched monocarboxylic acids having from 5 to 18 carbon atoms in the molecule;
  (4) cyclic and acyclic olefins;
  (5) amides of alpha,beta-olefinically unsaturated carboxylic acids;
  (6) monomers containing epoxide groups;
  (7) vinylaromatic hydrocarbons;
  (8) nitriles;
  (9) vinyl halides, N-vinylamides, vinyl ethers, and vinyl esters;
  (10) allyl ethers and allyl esters;
  (11) polysiloxane macromonomers having a number average molecular weight Mn of from 1,000 to 40,000 and containing on average from 0.5 to 2.5 ethylenically unsaturated double bonds per molecule; and
  (12) monomers containing carbamate groups and monomers containing allophanate groups.

15. The dispersion as claimed in claim 1, containing from 0.1 to 20% by weight of the hydrophilic nanoparticles (B), based on its solids.

16. A process for preparing an aqueous dispersion substantially free of volatile organic compounds, as claimed in claim 1, which comprises mixing
  (1) at least one aqueous dispersion substantially free of volatile organic compounds and comprising
    (A) at least one block copolymer prepared by two-stage or multistage free-radical copolymerization in an aqueous medium of
      a) at least one olefinically unsaturated monomer selected from the group consisting of hydrophilic and hydrophobic olefinically unsaturated monomers, and
      b) at least one olefinically unsaturated monomer different than the olefinically unsaturated monomer (a) and of the general formula I $$R^1R^2C\!=\!CR^3R^4 \qquad (I)$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals;
  (2) with at least one kind of hydrophilic nanoparticles (B).

17. The process as claimed in claim 16, wherein the hydrophilic nanoparticles (B) are mixed in the form of at least one aqueous dispersion, substantially free of volatile organic compounds, of at least one kind of hydrophilic nanoparticles (B).

18. The process as claimed in claim 17, wherein the aqueous dispersion, substantially free of volatile organic compounds, of at least one kind of hydrophilic nanoparticles (B) is prepared by wet grinding.

19. A composition comprising a dispersion as claimed in claim 1, wherein said composition is a coating material, adhesive or sealing compound.

20. The composition as claimed in claim 19, wherein the coating material, adhesive or sealing compound is suitable to coat, bond or seal motor vehicle bodies and parts thereof, buildings inside and outside, doors, windows, and furniture, or to coat, bond, and seal in the context of industrial coating, including coils, containers, electrical components, and white goods.

21. An aqueous composition as claimed in claim 1, wherein at least two of the variables $R^1$, $R^2$, $R^3$, and $R^4$ are substituted or unsubstituted aryl radicals.

22. A process for preparing an aqueous dispersion as claimed in claim 16, wherein at least two of the variables $R^1$, $R^2$, $R^3$, and $R^4$ are substituted or unsubstituted aryl radicals.

23. A composition comprising a dispersion prepared by the process as claimed in claim 16, wherein said composition is a coating material, adhesive, or sealing compound.

24. The composition as claimed in claim 23, wherein the coating material, adhesive or sealing compound is suitable to coat, bond or seal motor vehicle bodies and parts thereof, buildings inside and outside, doors, windows, and furniture, or to coat, bond, and seal in the context of industrial coating, including coils, containers, electrical components, and white goods.

* * * * *